United States Patent Office 3,286,541
Patented Nov. 22, 1966

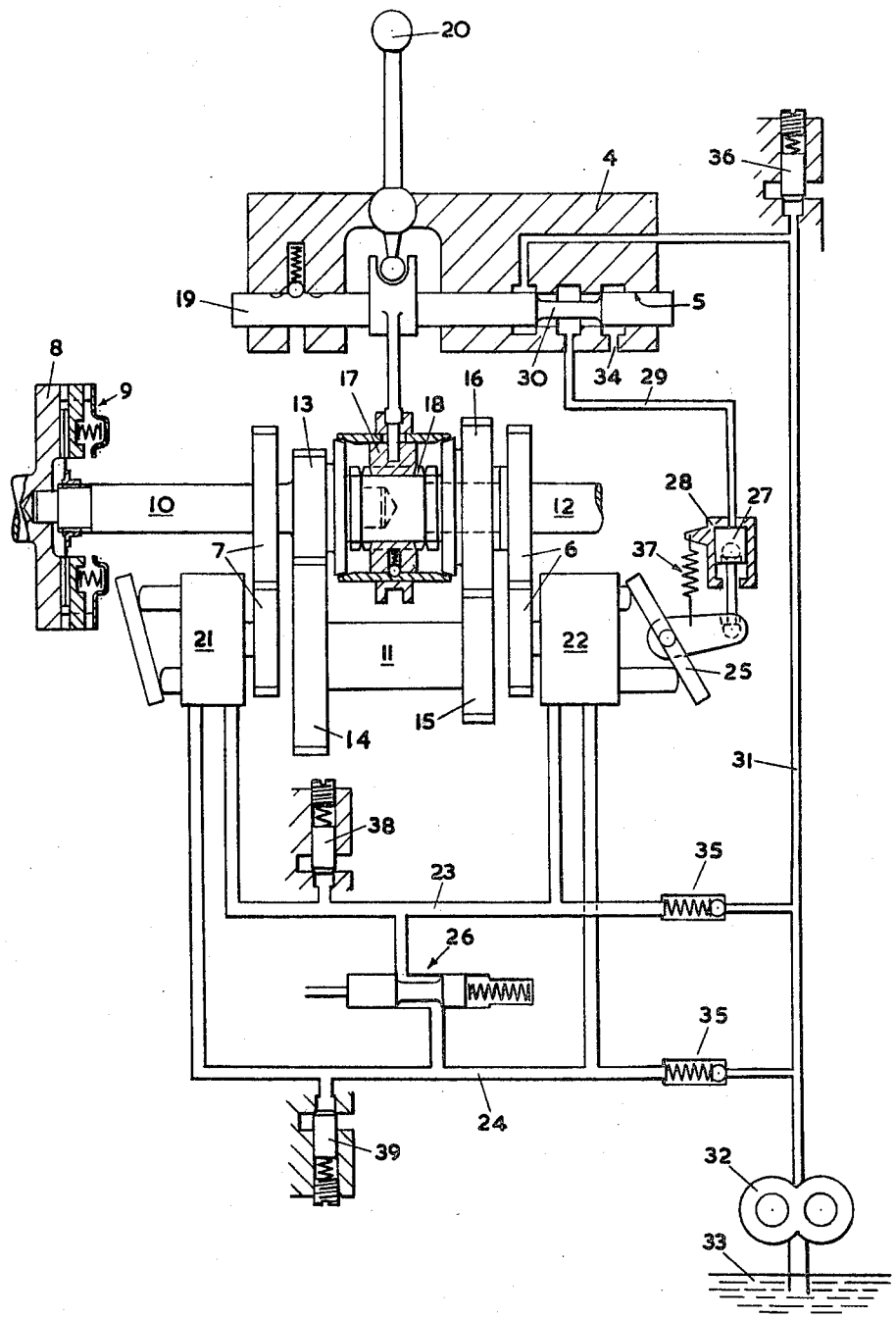

3,286,541
VARIABLE SPEED GEARBOXES
Kenneth Dearnley and Thomas Eastwood, Huddersfield, England, assignors to David Brown Tractors Limited
Filed Nov. 27, 1963, Ser. No. 326,458
Claims priority, application Great Britain, Dec. 4, 1962, 45,712/62
7 Claims. (Cl. 74—339)

This invention relates to variable speed gearboxes, and more particularly to means for facilitating changes of gear ratio in such gearboxes. The invention is especially, but not exclusively, applicable to variable speed gearboxes for transmitting high torque, in which the size and thus the inertia of the rotating parts is large.

To achieve a smooth change of gear ratio, it is necessary to bring into the required ratio, in a very short period of time, the relative speeds of two rotating parts to be drivably connected together, and to prevent or "baulk" their connection together until their relative speeds are in exactly the required ratio.

According to the invention, a variable speed gearbox comprises a multiratio toothed gear power transmission mechanism for transmitting torque between input and output shafts, a variable speed hydrostatic power transmission mechanism drivably connected between two rotating parts of said toothed gear power transmission mechanism which are to be mechanically connected together after their relative speeds have been brought into a required ratio, means for adjusting the speed ratio of said hydrostatic power transmission mechanism to the same as that required between said rotating parts, and mechanical inertia lock means for baulking the connection together of the rotating parts until their relative speeds are in exactly the required ratio. Preferably, the speed ratio of the hydrostatic power transmission mechanism is controlled by the same means as are employed for mechanically connecting and disconnecting said rotating parts. Preferably, also, the hydrostatic power transmission mechanism comprises a variable capacity hydraulic pump drivably connected to one of the rotating parts and a fixed or variable capacity hydraulic pump drivably connected to the other of said parts, said pumps being connected in a hydraulic circuit. The term "pump" as herein applied to the components of the hydrostatic power transmission mechanism is intended to denote a hydraulic device capable of acting as a pump or as a motor according to operating conditions.

A preferred embodiment of the invention will now be described, by way of example only, with reference to the accompanying drawing, which is a diagrammatic view of a variable speed gearbox, for a vehicle, provided with means according to the invention for adjusting the relative speeds of two rotating parts of the gearbox prior to their being drivably connected together.

Referring now to the drawing, a variable speed gearbox for a vehicle comprises an input shaft 10, as layshaft 11 and an output shaft 12. The input shaft 10 carries rigidly a toothed pinion 13 which meshes constantly with a toothed wheel 14 carried rigidly by the layshaft 11, and the latter also carries rigidly a second toothed pinion 15 which meshes constantly with a toothed wheel 16 which is freely rotatable on the output shaft 12. A conventional toothed coupling 17 incorporating synchromesh and inertia lock means is slidable by a selector rod 19 on splines 18 on the output shaft 12 to enable the toothed wheel 16 to be secured to said shaft or to enable the input shaft 10 and the output shaft 12 to be directly drivably connected together. A hand lever 20 is adapted to operate the selector rod 19 and a friction clutch 9 is adapted to connect or disconnect a flywheel 8 of an engine (not shown) to or from the input shaft 10.

A fixed capacity swash-plate pump 21 is driven from the input shaft 10 by a pair of gears 7, and a variable capacity swash-plate pump 22 is driven from the output shaft 12 by a pair of gears 6. The two pumps 21 and 22 are connected together hydraulically in a substantially closed circuit by two conduits 23 and 24 to form a hydrostatic power transmission mechanism by means of which, whilst the vehicle is in motion and the friction clutch 9 and the toothed coupling 17 are disengaged, the speed ratio between the input shaft 10 and the output shaft 12 can be adjusted by appropriate angular movement of the swash plate 25 of the variable capacity pump 22. This adjustment in the speed ratio is approximately equal to the variation in the speed ratio caused by changing the transmission path through the toothed gear power transmission mechanism. A bypass valve 26 connecting the two conduits 23 and 24, and adapted to be held closed by the actuating mechanism for the friction clutch 9 when said clutch is disengaged, is provided to unload the hydrostatic power transmission mechanism while drive is being transmitted by the toothed gear power transmission mechanism.

The control means for adjusting the speed ratio of the hydrostatic power transmission mechanism comprise a piston 27 slidable in a cylinder 28 and adapted to move the swash plate 25 angularly in one direction said swash plate being urged by a spring 37 in the other direction. The cylinder 28 communicates via a conduit 29 with a reduced diameter portion 30 formed in an extension of the selector rod 19, said extension being slidable in a bore 5 formed in a housing 4. The length of the portion 30 is such that movement of the selector rod 19 towards the position in which the input shaft 10 is directly drivably connected to the output shaft 12 places the conduit 29 in communication with a conduit 31 through which oil under pressure is supplied to the cylinder 28 by a pump 32 from a sump 33, whilst movement of the selector rod towards the position in which the toothed wheel 16 is secured to the output shaft 12 places the conduit 29 in communication with a conduit 34 so as to connect the cylinder 28 to the sump 33.

Two nonreturn valves 35 connect the conduit 31 to the respective conduits 23 and 24 of the hydrostatic power transmission mechanism to enable the pump 32 to maintain the conduits 23 and 24 full of oil at a predetermined minimum pressure. Pressure relief valves 36, 38 and 39 are provided to prevent excessive pressures in the respective conduits 31, 23 and 24.

In operation, the clutch 9 and the hand lever 20 are used in known manner to establish a transmission path between the input shaft 10 and the output shaft 12 either directly or via the layshaft 11, and the synchromesh means of the toothed coupling 17 adjust the relative speeds of said shafts during changes from one transmission path to the other. The hydrostatic power transmission mechanism works in combination with said synchromesh means to facilitate adjustment of the relative speeds of the inlet shaft 10 and the output shaft 12. When a change in the transmission path is required, the friction clutch 9 is disengaged and the hand lever 20 is moved into its "neutral" position. Movement of the hand lever 20 is then continued without interruption to move the toothed coupling 17 towards the position in which the required transmission path will be established, but before this position is reached the inertia lock means are actuated by the difference in relative speeds between the inlet shaft 10 and the outlet shaft 12 to baulk engagement of the toothed coupling 17, and the slide valve action of the selector rod 19 effects appropriate angular movement of the swash plate 25. The bypass valve 26 is held closed, and the hydrostatic power transmission mechanism is thus set to operate in the same speed ratio as that of the required transmission path between the input shaft 10 and the output shaft 12, and acts very rapidly in combination with the synchromesh means of the toothed coupling 17 to dissipate or supply energy and bring the relative speeds of said shafts to this ratio. The inertia lock means of the toothed coupling 17 then permit the required transmission path to be established by the completion of the movement of the hand lever 20 and selector rod 19 and the consequent engagement of the toothed coupling 17. The friction clutch 9 is then re-engaged, the hydrostatic power transmission mechanism thus being unloaded by the bypass valve 26 and remaining inoperative until another change in the transmission path is required.

Inter alia, the following modifications are possible:

Additional transmission paths can be incorporated in the multi-ratio toothed gear power transmission mechanism, additional slide valve means being incorporated in the selector rods adapted to establish said additional transmission paths whereby appropriate adjustments in the speed ratio of the hydrostatic power transmission mechanism are made during changes of said transmission paths.

Instead of one of the pumps of the hydrostatic power transmission mechanism being driven by the input shaft, it can equally well be driven by the layshaft.

The hydrostatic power transmission mechanism can comprise two variable capacity pumps, the control means of which are connected in such a manner that as the capacity of one pump increases the capacity of the other pump decreases. This is advantageous if the overall ratio of the gearbox is large, since the overall ratio of the hydrostatic power transmission mechanism can be much greater than if one pump were of fixed capacity, and there is the further advantage that smaller pumps can be employed.

The control means for varying the ratio of the hydrostatic power transmission mechanism need not be actuated hydraulically but can be actuated in any other convenient manner, for instance by means of a mechanical linkage connected to the hand lever. When more than two alternative transmission paths are provided and additional toothed gears carried rigidly by the layshaft mesh with additional toothed gears which are freely rotatable on the output shaft, every gear on the layshaft which meshes with a gear on the output shaft can drive a fixed capacity pump, each of said pumps having a different output, and a fixed capacity pump driven by the output shaft can be selectively connected to the appropriate one of the pumps driven by the layshaft when the hand lever is actuated.

The pumps employed can be of any convenient type.

What we claim is:

1. A variable speed gearbox comprising a multi-ratio toothed gear power transmission mechanism for transmission mechanism for transmitting torque between input and output shafts, said transmission having two rotating parts and means for mechanically connecting said parts together when their relative speeds have been brought into a required ratio, a variable speed hydrostatic power transmission mechanism drivably connected between said two rotating parts of said toothed gear power transmission mechanism which are to be mechanically connected together, means for adjusting the speed ratio of said hydrostatic power transmission mechanism to the same as that required between said rotating parts, and mechanical inertia lock means for baulking the mechanical connection together of said rotating parts by said mechanical connecting means until their relative speeds are in exactly the required ratio.

2. A variable speed gearbox according to claim 1, comprising a common control means for mechanically connecting and disconnecting said rotating parts and for actuating the means for adjusting the speed ratio of the hydrostatic power transmission mechanism.

3. A variable speed gearbox according to claim 2, wherein the hydrostatic power transmission mechanism comprises a variable capacity hydraulic pump connected to one of the rotating parts and a hydraulic pump drivably connected to the other of said parts, said pumps being connected in a hydraulic circuit.

4. A variable speed gearbox according to claim 3, wherein the means for adjusting the speed ratio of the hydrostatic power transmission mechanism comprise a piston slidable in a cylinder operatively connected into said circuit.

5. A variable speed gearbox according to claim 4, wherein the means for controlling the speed ratio of the hydrostatic power transmission mechanism comprises at least one slidable selector rod for the toothed gear power transmission mechanism, said rod incorporating valve means for controlling the position of said piston in the cylinder.

6. A variable speed gearbox according to claim 3, comprising a disengageable friction clutch on the input shaft of the toothed gear power transmission mechanism, and means for unloading the hydrostatic power transmission mechanism when said clutch is engaged.

7. A variable speed gearbox according to claim 6, wherein the means for unloading the hydrostatic power transmission mechanism comprise a valve adapted when open to conjoin the inlet and outlet ports of each pump.

References Cited by the Examiner

UNITED STATES PATENTS 3,095,757  7/1963  Thoma _____ 74—339

FOREIGN PATENTS 457,880  3/1928  Germany.

DAVID J. WILLIAMOWSKY, *Primary Examiner.*

H. S. LAYTON, *Assistant Examiner.*